United States Patent
Zinner (10) Patent No.: US 10,009,192 B2
(45) Date of Patent: Jun. 26, 2018

(54) SWITCHING DEVICE AND OPERATING PROCEDURE THEREFOR

(71) Applicant: Robert Bosch GmbH, Stuttgart (DE)

(72) Inventor: Helge Zinner, Magdeburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 151 days.

(21) Appl. No.: 15/074,865

(22) Filed: Mar. 18, 2016

(65) Prior Publication Data
US 2016/0301544 A1 Oct. 13, 2016

(30) Foreign Application Priority Data
Apr. 10, 2015 (DE) .................. 10 2015 206 483

(51) Int. Cl.
*H04L 12/40* (2006.01)
*H04L 12/44* (2006.01)

(52) U.S. Cl.
CPC .............. *H04L 12/40182* (2013.01); *H04L 2012/40273* (2013.01); *H04L 2012/445* (2013.01)

(58) Field of Classification Search
None
See application file for complete search history.

(56) References Cited

U.S. PATENT DOCUMENTS

| | | | |
|---|---|---|---|
| 6,704,296 B1 * | 3/2004 | Crayford | H04L 12/44 370/279 |
| 6,973,043 B1 * | 12/2005 | Farooq | H04L 43/026 370/250 |
| 2012/0203941 A1 * | 8/2012 | Iima | G06F 13/00 710/52 |
| 2013/0163604 A1 * | 6/2013 | Kondapalli | H04L 49/351 370/401 |
| 2016/0006578 A1 * | 1/2016 | Zhong | H04L 49/351 370/254 |

* cited by examiner

*Primary Examiner* — Xavier Szewai Wong
(74) *Attorney, Agent, or Firm* — Norton Rose Fulbright US LLP; Gerard Messina (57) ABSTRACT

A switching device including a first interface for contacting a media-independent interface of a first physical interface unit, and a second interface for contacting a media-independent interface of a second physical interface unit. The switching device is designed to couple the first interface to the second interface.

13 Claims, 5 Drawing Sheets

SWITCHING DEVICE AND OPERATING PROCEDURE THEREFOR

CROSS REFERENCE

The present application claims the benefit under 35 U.S.C. § 119 of German Patent Application No. 102015206483.2 filed on Apr. 10, 2015, which is expressly incorporated herein by reference in its entirety.

BACKGROUND INFORMATION

The present invention relates to a switching device, a switch, a control and/or regulating device, a network system and an operating procedure for a switching device.

Arrangements of electronic assemblies, such as control units, in motor vehicles which are able to communicate with each other with the aid of different bus systems and/or protocols are known from the market. For example, a motor vehicle may include up to approximately 100 such control units or assemblies.

SUMMARY

Features which may be important for the present invention are described below and are shown in the figures. The features may be important for the present invention either alone or also in various combinations, without making explicit reference thereto again.

The present invention relates to a switching device including a first interface for contacting a media-independent interface of a first physical interface unit, and a second interface for contacting a media-independent interface of a second physical interface unit, the switching device being designed to couple the first interface to the second interface. In particular, the term "couple" may mean the establishment of a respective electrical or at least logical connection between the interfaces, the connection in each case being establishable with the aid of a digital circuit or an electronic analog switch or the like, for example. The switching device may thus be switched over from a first state to a second state (and vice versa).

The switching device preferably additionally includes a third and a fourth interface, which are contactable with a further unit which (may be arbitrary) and is able to or is to communicate via the first and second physical interface units. The switching device thus allows at least the first and the second physical interface units to couple to each other, or not couple to each other, as a function of predefinable criteria. The predefinable criteria in particular characterize a normal or a faulty operating state of the aforementioned further unit, which is a switch for example, as is described in greater detail below.

For example, so-called "media-independent" interfaces of the first and second physical interface units are connected to a backbone of a network system, for example for a motor vehicle.

If the further unit or the switch has a faulty operating state, the first and the second physical interface units may advantageously be coupled to each other with the aid of the switching device and thus directly communicate with each other. This may advantageously make it possible to keep the described backbone at least partially functional and, for example, bring the motor vehicle into a safe operating state.

In one preferred embodiment, the switching device includes a third and a fourth interface for contacting with a controllable switching unit, the switching device being designed to couple the first interface to the third interface and the second interface to the fourth interface in a first operating state, and the switching device being further designed to couple the first interface to the second interface and to disconnect the third and the fourth interfaces in a second operating state.

With the aid of the disconnection of the third and fourth interfaces, the coupling of the first and second interfaces already described above may take place independently of a (faulty) state of the further unit or the switch, whereby the functionality of the switching device (and thus also that of the described backbone) is further improved. The faulty state may be caused, for example, by a defective electronic component or an undervoltage or an overvoltage in a motor vehicle electrical system, or by electromagnetic radiation or a program error, or by a possibly excessively high data volume (memory fault, "buffer overflow").

The switching device is preferably designed in such a way that the first and/or the second and/or the third and/or the fourth interface(s) each include(s) multiple connections. This broadens the options of the switching device, as is described in greater detail below based on the example of an Ethernet switch.

Moreover, it may be provided that the switching device includes a control device which is designed to control the operation of the switching device, in particular the coupling of the interfaces, as a function of an external signal, in particular as a function of a signal which may be fed to the control device by an external unit. In this way, the switching device may advantageously be supplemented by logic functions and, for example, make a decision about a respective required coupling of the interfaces generally independently of the physical interface unit and/or of the controllable switching unit.

As an alternative or in addition, the control device may be designed to control the operation of the switching device, in particular the coupling of the interfaces, as a function of a signal available at the interfaces.

In one further embodiment, the switching device is autonomously designed, i.e., without the use of said control device, to carry out the coupling of the interfaces as a function of an external signal, in particular as a function of a signal which may be fed by an external unit. In this embodiment, the switching device is so-to-speak only an actuator, for example a system of gates, multiplexers or electronic analog switches, a logic control taking place from outside the switching device.

The above-described control device is preferably designed to control the switching device in such a way that the first interface is coupled to the third interface and the second interface is coupled to the fourth interface (during a normal operating state of the switch) and/or the first interface is coupled to the second interface and/or the third interface and the fourth interface are disconnected (each in a faulty operating state of the switch). In this way, the switching device is able to carry out couplings between its total of four interfaces in an almost universal manner, whereby the functionality of the switching device and the operation of the network system are improved.

The present invention furthermore includes a switch including at least one first and one second physical interface unit, the switch including at least one switching device according to the above-described embodiments, the first interface of the switching device being connected to the media-independent interface of the first physical interface unit, and the second interface of the switching device being connected to the media-independent interface of the second physical interface unit. With the aid of the switching device, at least one rest functionality may be made possible in a faulty operating state, as was already described above.

The switching device of the switch preferably also includes a third and a fourth interface for contacting with the controllable switching unit, the switching device being designed to couple the first interface to the third interface and the second interface to the fourth interface in the first operating state, and the switching device being further designed to couple the first interface to the second interface and disconnect the third and the fourth interfaces in the second operating state. This results in comparable advantages as was already described above.

In particular, it may be provided that the switch is designed as an Ethernet switch, the first and the second physical interface units being Ethernet-compatible interface units, and the media-independent interfaces being Ethernet media-independent interfaces (MIIs). The switch may advantageously be operated in an Ethernet network, in particular in a motor vehicle. In particular, a cost-effective way is thus made possible to increase a redundancy in the Ethernet network and thus improve the safety of the motor vehicle in a fault condition.

The switch preferably includes at least one controllable switching unit (which in turn may include a circuit switching network for switching signal paths), a terminal for a signal of the at least one controllable switching unit being connected to the switching device and/or to a control unit which controls the operation of the switching device. The aforementioned terminal may be an output terminal or an input terminal of the controllable switching unit.

An arrangement is provided in a further embodiment of the switch to ascertain a signal present at the media-independent interface(s), and a further arrangement is provided to control the switching device and/or the control unit which controls the operation of the switching device as a function of the signal. The aforementioned media-independent interfaces may belong to the controllable switching unit and/or the physical interface units. For example, so-called "heartbeat" signals of the network and/or so-called "link signals" of a media access control ("MAC") unit of the controllable switching unit and/or so-called "link signals" of the physical interface units may thus be used to indirectly or directly actuate, in particular switch over, the switching device.

In one further embodiment of the switch, a terminal for a signal of the first and/or the second physical interface unit(s) is connected to the switching device and/or to the control unit which controls the operation of the switching device. The aforementioned terminal may be an output terminal or an input terminal of the particular physical interface unit. The terminal is present, for example, in addition to the media-independent interfaces at the physical interface unit. In this way, the switching device may advantageously be actuated by the physical interface unit.

An arrangement is provided in a further embodiment of the switch to ascertain a current flowing via the first and/or via the second physical interface unit(s) and/or a voltage present at the media-independent interface of the first and/or the second physical interface unit(s) and/or a signal present at the media-independent interface of the first and/or the second physical interface unit(s), a further arrangement is provided to control the switching device and/or the control unit which controls the operation of the switching device as a function of the current and/or of the voltage and/or of the signal.

For example, this may thus allow a so-called "power over Ethernet" concept or a so-called "power over data line" concept to be used or to be considered for actuating the switching device. The physical interface units may be supplied with electrical energy from the controllable switching unit, for example, or vice versa the controllable switching unit may be supplied with electrical energy from the physical interface unit. Correspondingly, the switching device may advantageously be actuated as a function of a predefinable voltage threshold value or predefinable current threshold value.

Moreover, it may be provided that at least one component of the switching device and at least one component of the physical interface units are situated on a shared circuit carrier, for example a circuit board. For example, the circuit board may be an element of a control unit in a motor vehicle. In this way, the switching device may be improved and its cost reduced.

Moreover, a control and/or regulating device ("control unit"), in particular for a motor vehicle, is introduced, the control and/or regulating device including at least one switching device and/or at least one switch according the respective above-described embodiments.

Moreover, a network system, in particular an Ethernet network system for a motor vehicle, is introduced, the network system including at least one switching device and/or at least one switch according to the respective above-described embodiments.

Moreover, a backbone for an Ethernet network system for a motor vehicle is introduced, preferably including a switching device and/or a switch according to one of the above-described embodiments. The backbone allows the network system to be designed in a particularly simple and simultaneously operationally reliable manner.

The object of the present invention may be further achieved by an operating procedure for a switching device according to the present invention.

Exemplary specific embodiments of the present invention are described below with reference to the figures.

BRIEF DESCRIPTION OF THE DRAWINGS

Functionally equivalent elements and variables in all figures are denoted by identical reference numerals, even in different specific embodiments.

DETAILED DESCRIPTION OF EXAMPLE EMBODIMENTS

Figure 1:
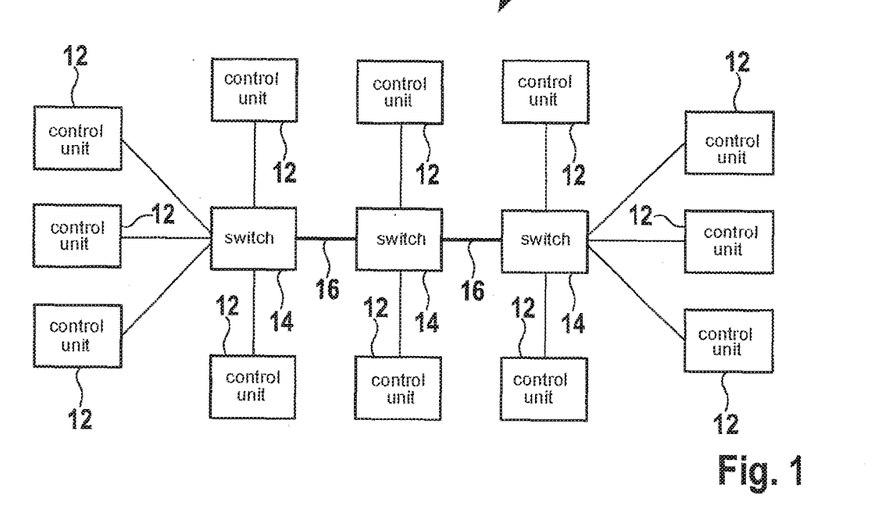
FIG. 1 shows a simplified diagram for an Ethernet network system in a motor vehicle.

FIG. 1 shows a simplified diagram for an Ethernet network system 10 for a motor vehicle which is not shown. In the present example, Ethernet network system 10 includes multiple Ethernet-capable control units 12 and in the present example three switching units, which in the present example are each designed as a so-called switch 14 ("Ethernet switch"). Switches 14 are connected to each other via a backbone 16 of network system 10. A subset of control units 12 is connected in each case to switches 14.

Switches 14 are generally connected to backbone 16 with the aid of physical interface units (see FIGS. 2 through 7). A respective media-independent interface of the physical interface unit is contacted with an "internal" area of respective switch 14, for example, and a respective media-[in]dependent interface of the physical interface unit is contacted with a line (for example a cable or a glass fiber) of backbone 16.

If, for example, central switch 14 shown in FIG. 1 is entirely or partially defective or faulty, this generally has serious consequences for the operation of network system 10. In particular, it is then possible that at least some of control units 12 are no longer able to communicate with one other.

Figure 2:
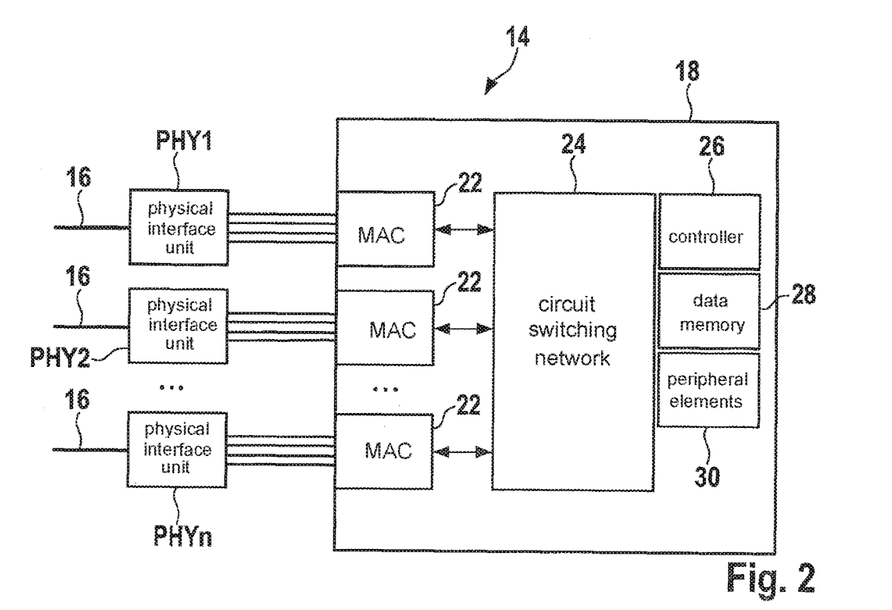
FIG. 2 shows a first simplified diagram for an Ethernet switch of the network system of FIG. 1.

FIG. 2 shows a first simplified diagram for an Ethernet switch 14 of network system 10 of FIG. 1. In the present example, switch 14 includes a controllable switching unit 18 (on the right in FIG. 2) and three (shown in FIG. 2) physical interface units PHY1, PHY2 and PHYn (on the left in FIG. 2). Controllable switching unit 18 is connected to physical interface units PHY1, PHY2 and PHYn via respective media-independent interfaces or connections (without reference numerals).

Moreover, controllable switching unit 18 includes three blocks for a media access control, which in the present example are each denoted by MAC 22 (media access control). MACs 22 are in the present example implemented according to an extension of the so-called "OSI model" designed by the Institute of Electrical and Electronics Engineers (IEEE). The Open Systems Interconnection (OSI) model is a reference model for network protocols having a layer architecture. It has been published as the standard by the International Telecommunication Union (ITU) since 1983, and since 1984 also by the International Organization for Standardization (ISO).

Controllable switching unit 18 moreover includes a circuit switching network 24 and a controller 26, a data memory 28 and peripheral elements 30. In the present example, controller 26 controls in particular circuit switching network 24.

Figure 3:
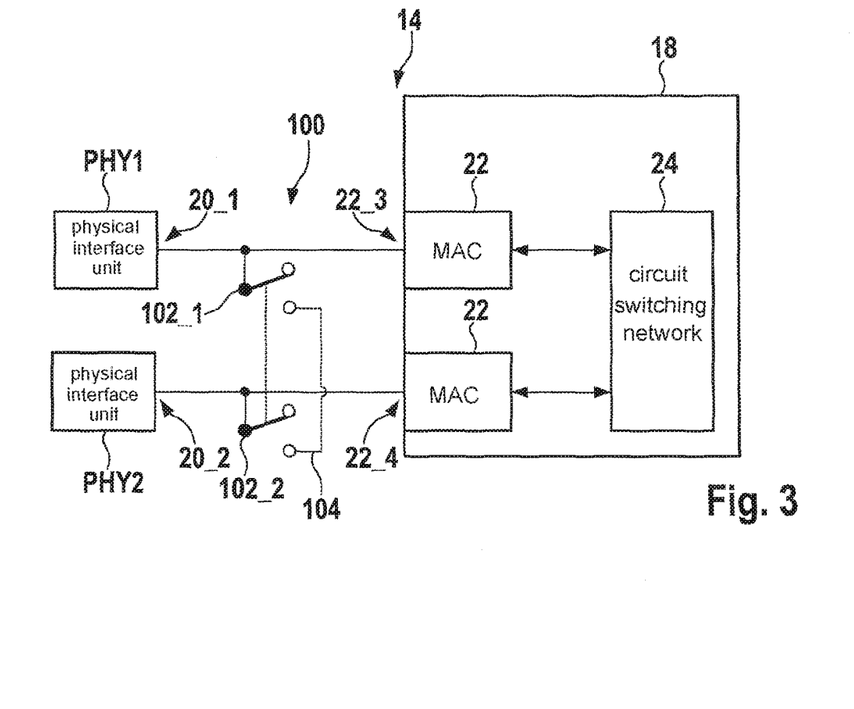
FIG. 3 shows a second simplified diagram for an Ethernet switch including a switching device in a first operating state.

FIG. 3 shows a second simplified diagram for switch 14. As is apparent, switch 14 in the present example includes a first and a second physical interface unit PHY1 and PHY2. Switch 14 may also include more than two physical interface units PHY1 and PHY2, if necessary; see the above-described FIG. 2.

Switch 14 is designed as an Ethernet switch, first and second physical interface units PHY1 and PHY2 being Ethernet-compatible interface units, and associated media-independent interfaces 20_1 and 20_2 (and correspondingly interfaces 22_3 and 22_4, see below) being Ethernet MIIs (media-independent interfaces).

The Ethernet MIIs, for example, include the interfaces or signals denoted hereafter by their abbreviations: MDIO, MDCLK, TXD, TXEN, RXDV, TXER, RXER, TXCLK, RXCLK, RXD, CSR, and COL.

Switch 14 in particular includes a switching device 100 including a first interface 102_1 for contacting media-independent interface 20_1 of first physical interface unit PHY1, and a second interface 102_2 for contacting media-independent interface 20_2 of second physical interface unit PHY2, switching device 100 being designed to couple first interface 102_1 to second interface 102_2.

As is furthermore apparent, first interface 102_1 is connected to media-independent interface 20_1 of first physical interface unit PHY1, and second interface 102_2 is connected to media-independent interface 20_2 of second physical interface unit PHY2.

In the present example, switching device 100 is symbolically represented as two toggles (without reference numerals) coupled mechanically to each other, a respective upper terminal (for example a so-called "rest contact") of the toggles being unconnected in FIG. 3. Respective lower terminals (for example so-called "operating contacts") of the toggles in FIG. 3 are electrically connected to each other via a connection 104.

Figure 4:
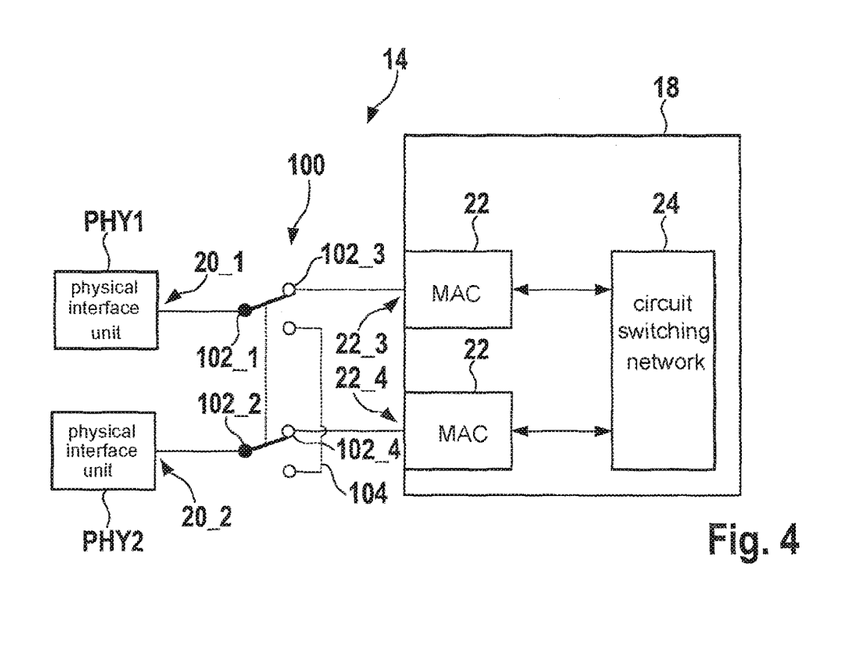
FIG. 4 shows a third simplified diagram for an Ethernet switch including a switching device in a first operating state.
Figure 5:
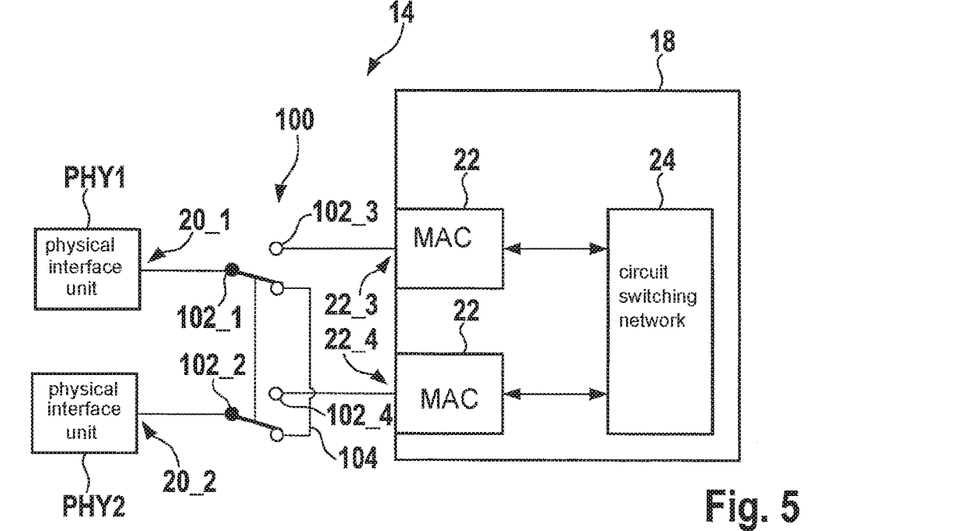
FIG. 5 shows the Ethernet switch of FIG. 4 in a second operating state.

It shall be understood that switching device 100, or the toggles shown in FIGS. 3 through 5, may be implemented in an almost arbitrary manner. For example, with the aid of relays, with the aid of transistor(s), with the aid of electronic analog switches, with the aid of digital gates or multiplexers, as part of a programmable or non-programmable analog or digital integrated circuit, as part of a processor, a microcontroller and the like.

Preferably at least one component of switching device 100 and at least one component of physical interface units PHY1 and PHY2 are situated on a shared circuit carrier, for example a circuit board. For example, the circuit board may be an element of a control unit 12, see FIG. 1.

In FIG. 3, media-independent interfaces 20_1 and 20_2 of physical interface units PHY1 and PHY2 are each directly connected to corresponding interfaces 22_3 and 22_4 of the two MACs 22 of controllable switching unit 18. Differently from FIG. 2, blocks 26, 28 and 30 of controllable switching unit 18 are not shown in FIG. 3 for the sake of simplicity. Interfaces 20_1, 20_2, 22_3 and 22_4 and correspondingly interfaces 102_1 and 102_2 (and interfaces 102_3 and 102_4, see below FIGS. 3 through 8) each include multiple (electrical) connections.

With the aid of switching device 100 of FIG. 3, it is possible to couple media-independent interfaces 20_1 and 20_2 to each other, i.e., in the present example to electrically connect these to each other. For example, switching device 100 is switched as shown in a normal ("first") operating state of switch 14.

In a second operating state deviating from the normal operating state, the toggles of switching device 100 may be switched over. Interfaces 20_1 and 20_2 are thus connected directly to each other via connection 104. This is in particular useful in a detected fault condition of controllable switching unit 18, whereby first and second physical interface units PHY1 and PHY2 are coupled to each other at media-independent interfaces 20_1 and 20_2, i.e., in the present example electrically or at least logically connected.

In this way, physical interface units PHY1 and PHY2 are also able to communicate with each other in the second operating state, whereby at least partial continued operation of backbone 16 (see FIG. 1) is possible despite a faulty switch 14. Since in this case according to the specific embodiment of FIG. 3 interfaces 22_3 and 22_4 of MAC 22 remain connected, interfaces 22_3 and 22_4 (if possible) are preferably brought into an electrically high resistance state by controller 26.

FIG. 4 shows a second simplified diagram for switch 14. Switching device 100 includes a third and a fourth interface 102_3 and 102_4 for contacting with controllable switching unit 18, switching device 100 being designed to couple first interface 102_1 to third interface 102_3 and second interface 102_2 to fourth interface 102_4 in a first operating state, and switching device 100 being further designed to couple first interface 102_1 to second interface 102_2 and to disconnect third and fourth interfaces 102_3 and 102_4 in a second operating state. FIG. 4 correspondingly shows the aforementioned first operating state.

In the first operating state according to FIG. 4, interface 20_1 is (electrically or logically) connected to interface 22_3 and interface 20_2 is (electrically or logically) connected to interface 22_4 with the aid of switching device 100. Switch 14 may operate normally.

FIG. 5 shows switch 14 and switching device 100 of FIG. 4 in the second operating state, which similarly as described for FIG. 3 deviates from the normal (first) operating state. Correspondingly, the toggles are switched downward in the drawing in FIG. 5. First and second physical interface units PHY1 and PHY2 are coupled to each other at their media-independent interfaces 20_1 and 20_2, i.e., in the present example electrically or logically connected. This takes place with the aid of connection 104 between the toggles.

In addition (and in contrast to the specific embodiment of FIG. 3), in FIG. 5 interfaces 102_3 and 102_4 of switching device 100, and thus also interfaces 22_3 and 22_4 of MACs 22 of controllable switching unit 18, are disconnected. In this way, the described coupling of media-independent interfaces 20_1 and 20_2 of physical interface units PHY1 and PHY2 may take place independently of a state of interfaces 22_3 and 22_4 of the two MACs 22. While controllable switching unit 18 is thus no longer able to cooperate with physical interface units PHY1 and PHY2, a possible path of backbone 16 via physical interface units PHY1 and PHY2 is kept functional.

It shall be understood that first and/or second and/or third and/or fourth interface(s) 102_1, 102_2, 102_3 and 102_4 each include(s) or may include multiple connections.

Figure 6:
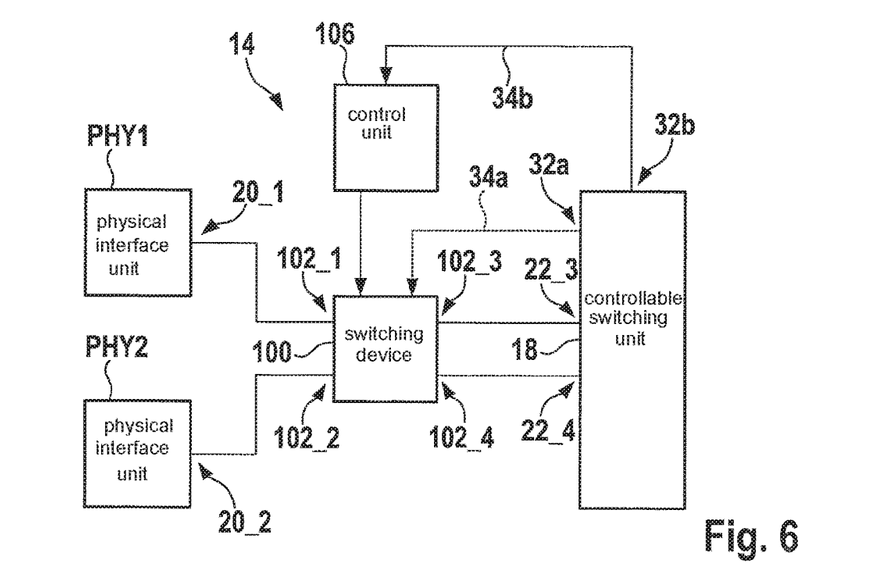
FIG. 6 shows a simplified diagram for the Ethernet switch of FIGS. 4 and 5 including a control device in a first further specific embodiment.

FIG. 6 shows a further simplified diagram for Ethernet switch 14 of FIGS. 4 and 5 in a first specific embodiment. Switch 14 includes controllable switching unit 18, a terminal 32a for a signal of controllable switching unit 18 being connected to switching device 100. This is represented in FIG. 6 by a (dotted) connection 34a. In this case, controllable switching unit 18 may control switching device 100 directly, i.e., directly actuate the toggles (see FIGS. 3 to 5).

In one preferred alternative specific embodiment, a terminal 32b for a signal of controllable switching unit 18 is connected via a connection 34b to a control unit 106 (at the top center of FIG. 6) which controls the operation of switching device 100.

Control unit 106 is designed to control switching device 100 in such a way that first interface 102_1 is coupled to third interface 102_3 and second interface 102_2 is coupled to fourth interface 102_4 and/or first interface 102_1 is coupled to second interface 102_2 and/or third interface 102_3 and fourth interface 102_4 is/are disconnected.

Control unit 106 is designed to control the operation of switching device 100, in particular the coupling of interfaces 102_1, 102_2, 102_3 and 102_4, as a function of an external signal, in particular as a function of a signal which may be fed to control unit 106 by an external unit. For example, the external unit may be controllable switching unit 18 and/or physical interface unit PHY1 or PHY2. Control unit 106 preferably includes a logic circuit which evaluates the signal according to predefinable criteria and actuates switching device 100 as a function thereof.

As an alternative or in addition, control unit 106 may be designed to control the operation of switching device 100, in particular the coupling of interfaces 102_1, 102_2, 102_3 and 102_4, as a function of a signal available at interfaces 102_1, 102_2, 102_3 and 102_4.

Figure 7:
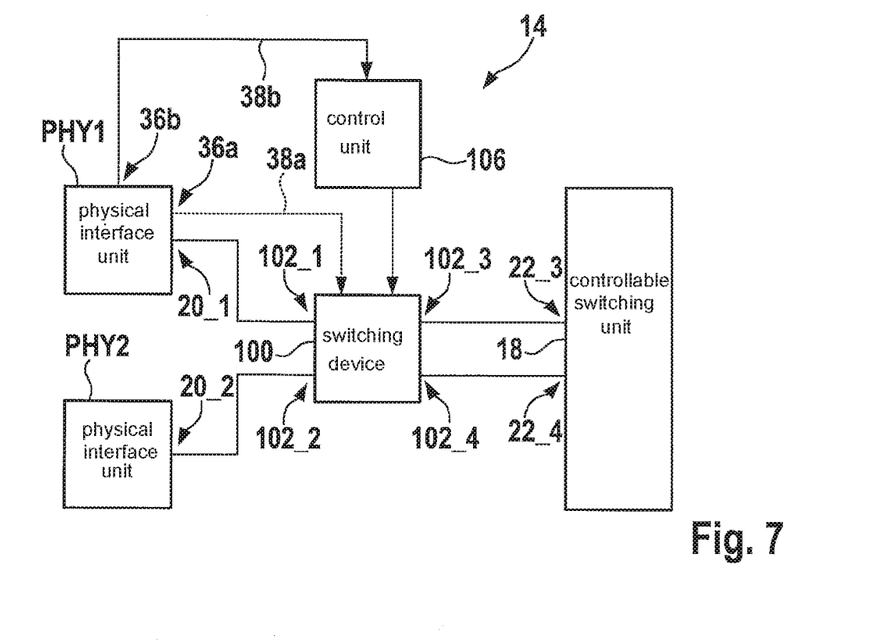
FIG. 7 shows the Ethernet switch of FIG. 6 in a second further specific embodiment.
Figure 8:
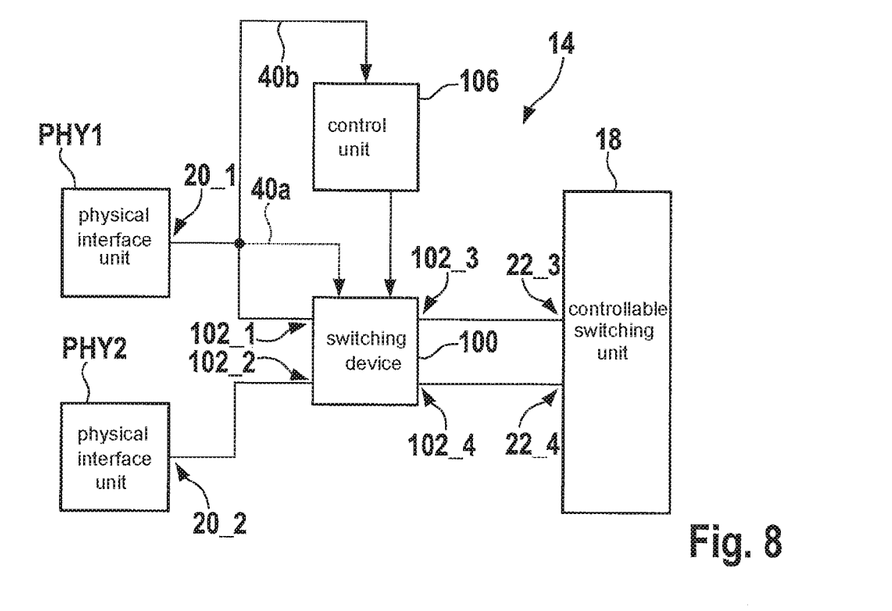
FIG. 8 shows the Ethernet switch of FIG. 6 in a third further specific embodiment.

In one specific embodiment, switching device 100 and control unit 106 are implemented as separate elements, as is shown in FIGS. 6 through 8. In a further specific embodiment, switching device 100 and control unit 106 are implemented as a joint element and combined in an integrated circuit, for example. In both described specific embodiments, switching device 100 and/or control unit 106 may be implemented, for example, as a digital gate circuit, as a programmable logic device, as a signal processor and/or as a microcontroller.

Corresponding to the specific embodiment of FIG. 6, switching device 100 may be actuated via a signal of controllable switching unit 18 or of switch 14. For example, the signal may be a reset signal, which is generated internally or externally by controllable switching unit 18 or switch 14 (for example at terminal 32a and/or 32b) when a fault is detected.

Moreover, an arrangement may be provided to ascertain a signal present at media-independent interface 22_3 or 22_4 of controllable switching unit 18, and a further arrangement may be provided to control switching device 100 and/or control unit 106 which controls the operation of switching device 100 as a function of the signal. For example, the aforementioned "arrangement" or the "further arrangement" are situated in control unit 106.

In one specific embodiment, the signal is a so-called "heartbeat" signal which is exchanged between two or multiple components of network system 10, so that these components are able to notify each other about being operational.

In one further specific embodiment, the signal is a so-called "link signal" of MAC 22 (see FIGS. 3 through 5) which is transmitted via interfaces 22_3 or 22_4, for example. This link signal makes it possible to ascertain and/or to indicate whether a (logical) connection between MAC 22 and physical interface unit PHY1 or PHY2 is present or not present.

Similarly to FIG. 6, FIG. 7 shows a simplified diagram for switch 14 in a second specific embodiment. A terminal 36a for a signal of first and/or second physical interface unit(s) PHY1, PHY2 is connected to switching device 100. This takes place in FIG. 7 by the dotted connection 38a. In one preferred alternative specific embodiment, a terminal 36b of first and/or of second physical interface unit(s) PHY1, PHY2 is connected via a connection 38b to control unit 106 which controls the operation of switching device 100.

It shall be understood that, in the specific embodiment of FIG. 7, physical interface unit PHY2, additionally or alternatively to physical interface unit PHY1, may also be connected in a comparable manner to control unit 106 or to switching device 100.

Corresponding to the specific embodiment of FIG. 7, switching device 100 may be actuated via a signal of physical interface unit PHY1 or PHY2. For example, the signal may be a reset signal, which is generated internally or externally by physical interface unit PHY1 or PHY2 (for example at terminal 36a and/or 36b) when a fault is detected.

In one further specific embodiment, the signal is a so-called "link signal" of physical interface unit PHY1 or PHY2, which is transmitted via interfaces 20_1 and 20_2, for example. This link signal makes it possible to ascertain and/or indicate whether a (logical) connection between physical interface unit PHY1 or PHY2 and respective MAC 22 is present or not present.

Similarly to FIGS. 6 and 7, FIG. 8 shows a simplified diagram for switch 14 in a third specific embodiment. An arrangement is provided to ascertain a current flowing via first and/or via second physical interface unit(s) PHY1 and/or PHY2 and/or a voltage present at media-independent interface 20_1 or 20_2 of first and/or second physical interface unit(s) PHY1 and/or PHY2 and/or a signal present at media-independent interface 20_1 or 20_2 of first and/or second physical interface unit(s) PHY1 and/or PHY2, a further arrangement is provided to control switching device 100 and/or control unit 106 which controls the operation of switching device 100 as a function of the current and/or of the voltage and/or of the signal.

For example, the aforementioned "arrangement" or the "further arrangement" are situated in control unit 106. For this purpose, FIG. 8 shows a (dotted, symbolic) connection 40a between media-independent interface 20_1 and switching device 100, and a connection 40b between media-independent interface 20_1 and control unit 106.

As an alternative or in addition, it is also possible to ascertain and evaluate a signal present at interfaces 22_3 and/or 22_4 of MACs 22 of controllable switching unit 18, as was already described above in a similar manner. For example, the aforementioned "arrangement" may be localized in controllable switching unit 18 for this purpose, and switch 14 may be designed similarly to FIG. 6.

For example, it is possible with the aid of the specific embodiments of FIGS. 6 through 8 to use a so-called "power over Ethernet" concept or a so-called "power over data line" concept for actuating switching device 100 or to take the same appropriately into consideration. In one specific embodiment, switch 14 may be supplied with DC voltage via backbone 16 and physical interface unit PHY1 or PHY2. In one further specific embodiment, physical interface unit PHY1 or PHY2 may be supplied with DC voltage by switch 14.

Corresponding to the specific embodiment of FIG. 8, switching device 100 may be actuated as a function of a predefinable voltage threshold value or a predefinable current threshold value, for example. For example, it may be provided that physical interface units PHY1 and PHY2 are each supplied with a DC voltage by switch 14 at media-independent interfaces 20_1 and 20_2. A comparison of the voltage or of the current in relation to the predefinable threshold values possibly allows a fault to be inferred and switching device 100 to be suitably actuated.

In one further specific embodiment of switch 14 and/or of switching device 100 it is possible, based on the specific embodiments of FIGS. 3 through 8, to actuate switching device 100 not only in the event of one of the above-described faulty operating states, but also as a function of further criteria. For example, switching device 100 may additionally be changed over with the aid of a time control and/or an event control. In this way it is possible to not only consider a faulty operating state, but also requirements in terms of an energy-saving operation of switch 14 or the like.

In further specific embodiments, switch 14 includes further physical interface units PHY3, PHY4 through PHYn (not shown in any of the FIGS. 3 through 8), in addition to physical interface units PHY1 and PHY2. Switching device 100 is designed in such a way that, or multiple switching devices 100 are present so that further switching options may be carried out.

For example, a connection may take place between respective media-independent interfaces of physical interface units PHY1 and PHY3, and/or a connection between controllable switching unit 18 and PHY4 may take place and more of the like, as a function of the above-described operating states and/or criteria. All this may take place additionally or alternatively to the switching options which are described for the FIGS. 3 through 8.

Figure 9:
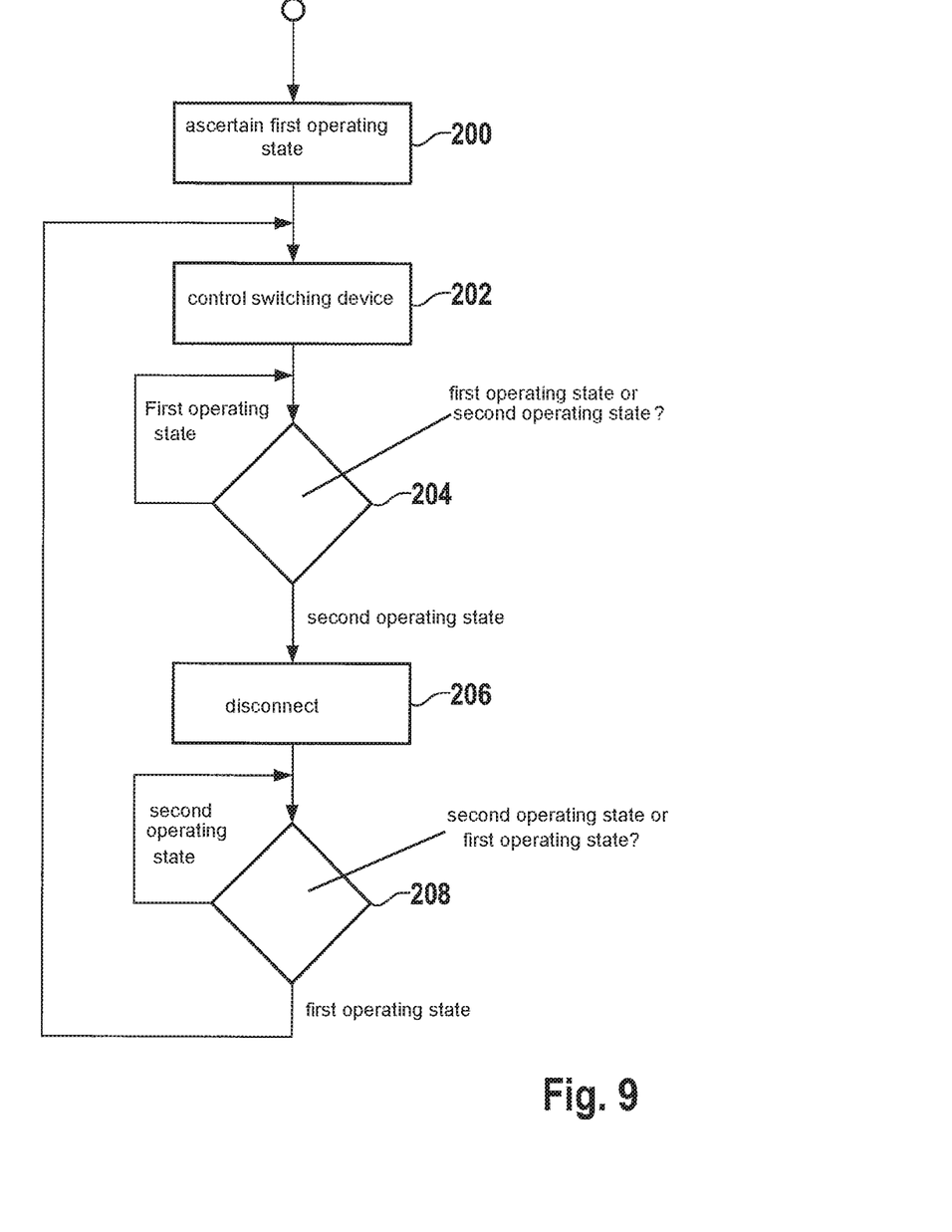
FIG. 9 shows a flow chart for a method for operating the switching device of FIGS. 3 through 8.

FIG. 9 shows a flow chart for a method for operating switching device 100, each according to one of FIGS. 3 through 8.

In a first step 200, a first operating state of switch 14 is ascertained, which corresponds to a normal operating state of switch 14, for example.

In a second step 202, switching device 100 is controlled in such a way that first interface 102_1 is coupled to third interface 102_3 and second interface 102_2 is coupled to fourth interface 102_4.

In a third step 204, it is queried whether the operating state continues to correspond to the first operating state (normal operating state) or a second operating state (faulty operating state). In the first case, the process branches back to the start of third step 204.

However, if a faulty operating state is ascertained in third step 204, the process branches to a subsequent fourth step 206. In fourth step 206, first interface 102_1 is coupled to second interface 102_2, and third interface 102_3 and fourth interface 102_4 are each disconnected.

In a fifth step 208, it is queried whether the operating state continues to correspond to the second operating state (faulty operating state) or to the first operating state (normal operating state). In the first case, the process branches back to the start of fifth step 208. However, if a normal operating state is ascertained in fifth step 208, the process branches back to second step 202.

What is claimed is:

1. A system, comprising:
    a first physical interface unit having a first media-independent interface;
    a second physical interface unit having a second media-independent interface;
    a switching device including a first interface for contacting the first media-independent interface of the first physical interface unit, and a second interface for contacting the second media-independent interface of the second physical interface unit, the switching device being designed to couple the first interface to the second interface; and
    a controllable switch including a plurality of media access control modules (MACS) and a circuit switching network;
    wherein:
        in a first operating state of the switching device: (i) the first physical interface unit is communicatively connected to a first one of the MACs of the controllable switch, and (ii) the second physical interface is communicatively connected to a second one of the MACs of the controllable switch, and
        in a second operating state of the switching device: (i) the first physical interface unit is directly communicatively connected to the second physical interface unit via the switching device, (ii) the first physical interface unit is communicatively disconnected from the first one of the MACs of the controllable switch, and (iii) the second physical interface unit is communicatively disconnected from the second one of the MACs of the controllable switch.

2. The system as recited in claim 1, wherein the switching device includes a third and a fourth interface for contacting with the controllable switching unit, and, in the first operating state, the switching device is designed to couple the first interface to the third interface and the second interface to the fourth interface to communicatively connect the first physical interface unit to the first one of the MACs of the controllable switch and communicatively connect the second physical interface unit to the second one of the MACs of the controllable switch, and, in the second operating state the switching device is further designed to couple the first interface to the second interface and disconnect the third and the fourth interfaces in a second operating state to directly communicatively connect the first physical interface unit to the second physical interface unit via the switching device, communicatively disconnect the first physical interface unit from the first one of the MACs of the controllable switch, and communicately disconnect the second physical interface unit from the second one of the MACs of the controllable switch.

3. The system as recited in claim 2, wherein at least one of the first, the second, the third, and the fourth interface includes multiple connections.

4. The system as recited in claim 2, wherein the switching device includes a control unit designed to control operation of the switching device, the operation including the coupling of the interfaces at least one of: i) as a function of an external signal, wherein the external signal being fed to the control unit by an external unit, and ii) as a function of a signal available at the interfaces.

5. The system as recited in claim 4, wherein the control unit is designed to control the switching device in such a way that at least one of: i) the first interface is coupled to the third interface and the second interface is coupled to the fourth interface, ii) the first interface is coupled to the second interface and iii) the third interface and the fourth interface are disconnected.

6. The system as recited in claim 1, wherein the switching device together with the controllable switch is designed as an Ethernet switch, the first and the second physical interface units are Ethernet-compatible interface units, and the first and second media-independent interfaces are Ethernet MII interfaces (media-independent interfaces).

7. The system as recited in claim 1, wherein an arrangement is provided to ascertain a signal present at the first and second media-independent interfaces, a further arrangement is provided to control, as a function of the signal, at least one of the switching device, and a control unit which controls operation of the switching device.

8. The system as recited in claim 1, wherein a terminal for a signal of at least one of the first and the second physical interface unit is connected to at least one of the switching device and a control unit which controls the operation of the switching device.

9. The system as recited in claim 1, wherein an arrangement is provided to ascertain at least one of: i) a current flowing at least one of via the first and via the second physical interface unit, and ii) a voltage present at the media-independent interface of one of the first and the second physical interface unit and iii) a signal present at the media-independent interface of at least one of the first and the second physical interface unit, and a further arrangement is provided to control, as a function of the at least one of the current, the voltage, and the signal, at least one of the switching device, and a control unit which controls the operation of the switching device.

10. The system as recited in claim 1, wherein at least one component of the switching device and at least one component of the physical interface units are situated on a shared circuit carrier.

11. The system as recited in claim 1, wherein the switching device is configured to switch from the first operating state of the switching device to the second operating state of the switching device when a fault condition is detected.

12. A method for operating a switching device including a first interface for contacting a media-independent interface of a first physical interface unit, and a second interface for contacting a media-independent interface of a second physical interface unit, the method comprising:
  performing, in a first operating state of the switching device:
    (i) communicatively connecting the first physical interface unit to a first media access control module of a controllable switch, and
    (ii) communicatively connecting the second physical interface unit to a second media access control module of the controllable switch; and performing, in a second operating state of the switching device:
    (i) coupling, by the switching device, the first interface to the second interface to directly communicatively connect the first physical interface unit to the second physical interface unit via the switching device,
    (ii) communicatively disconnecting the first physical interface unit from the first one of the MACs of the controllable switch, and
    (iii) communicatively disconnecting the second physical interface unit from the second one of the MACs of the controllable switch.

13. The method as recited in claim 12, further comprising:
  detecting a fault condition; and
  switching, by the switching device, from the first operating state of the switching device to the second operating state of the switching device based on detecting the fault condition.

* * * * *